(12) United States Patent
Joe et al.

(10) Patent No.: US 11,378,000 B2
(45) Date of Patent: Jul. 5, 2022

(54) COOLANT HEATER FOR A VEHICLE

(71) Applicants: HYUNDAI MOTOR COMPANY, Seoul (KR); KIA MOTORS CORPORATION, Seoul (KR); DOOWON CLIMATE CONTROL CO., LTD, Asan-si (KR)

(72) Inventors: Wang Hyun Joe, Bucheon-si (KR); Jong Chul Kim, Cheonan-si (KR); Ki Seung Bae, Asan-si (KR)

(73) Assignees: HYUNDAI MOTOR COMPANY, Seoul (KR); KIA MOTORS CORPORATION, Seoul (KR); DOOWON CLIMATE CONTROL CO., LTD, Asan-si (KR)

( * ) Notice: Subject to any disclaimer, the term of this patent is extended or adjusted under 35 U.S.C. 154(b) by 158 days.

(21) Appl. No.: 16/919,904

(22) Filed: Jul. 2, 2020

(65) Prior Publication Data

US 2021/0071565 A1   Mar. 11, 2021

(30) Foreign Application Priority Data

Sep. 6, 2019   (KR) .......................... 10-2019-0110980

(51) Int. Cl.
*F01P 7/16*   (2006.01)
*H05B 1/02*   (2006.01)
*F02N 19/10*   (2010.01)
*B60H 1/00*   (2006.01)

(52) U.S. Cl.
CPC .......... *F01P 7/167* (2013.01); *B60H 1/00314* (2013.01); *F02N 19/10* (2013.01); *H05B 1/0236* (2013.01); *H05B 1/0297* (2013.01)

(58) Field of Classification Search
CPC ...... F01P 7/167; H05B 1/0236; H05B 1/0297; B60H 1/00314; F02N 19/10
USPC .................................................... 123/142.5 E
See application file for complete search history.

(56) References Cited

U.S. PATENT DOCUMENTS

| 2,266,216 | A | * | 12/1941 | Kimberlin | ................ H05B 3/06 392/497 |
| 3,979,574 | A | * | 9/1976 | Rynard | .................... H05B 3/06 392/501 |
| 2006/0272605 | A1 | * | 12/2006 | Wright | .................... F02N 19/10 123/41.31 |

FOREIGN PATENT DOCUMENTS

DE   102013102358 A1   9/2014
SE     200201616 A  * 12/2003   ......... B60H 1/00735

* cited by examiner

*Primary Examiner* — Mahmoud Gimie
(74) *Attorney, Agent, or Firm* — Lempia Summerfield Katz LLC

(57) ABSTRACT

A coolant heater for a vehicle includes: a housing unit having an inlet part through which a coolant is introduced and an outlet part through which the coolant is discharged; a baffle assembly provided in an internal space of the housing unit and having a first flow path through which the coolant flows in a first direction and a second flow path through which the coolant, passing through the first flow path, flows in a second direction different from the first direction; a first heater part provided in the first flow path; and a second heater part provided in the second flow path. The coolant heater makes it possible to obtain an advantageous effect of improving a fast-acting heating performance and heating efficiency.

19 Claims, 11 Drawing Sheets

COOLANT HEATER FOR A VEHICLE

CROSS-REFERENCE TO RELATED APPLICATIONS

This application claims priority to and the benefit of Korean Patent Application No. 10-2019-0110980 filed in the Korean Intellectual Property Office on Sep. 6, 2019, the entire contents of which are incorporated herein by reference.

TECHNICAL FIELD

The present disclosure relates to a coolant heater for a vehicle, and more particularly, to a coolant heater for a vehicle, which is capable of improving fast-acting heating performance and heating efficiency of a vehicle.

BACKGROUND ART

Currently, the most common type of vehicle is a vehicle using, as a driving source, an engine that uses gasoline, diesel, or the like as an energy source. However, there is an increasing need for a new energy source for various reasons such as environmental pollution caused by the above-mentioned energy sources for a vehicle, a reduction in oil reserves, or the like.

Currently, one of the technologies closest to practical use is a technology associated with a vehicle driven by using a fuel cell as an energy source.

However, unlike a vehicle using an engine, the vehicle using the fuel cell cannot use a heating system using a coolant. In other words, in the case of the vehicle using, as a driving source, the engine that uses petroleum as an energy source, a very large amount of heat is generated in the engine. A coolant circulation system for cooling the engine is provided, and heat, which is absorbed by the coolant from the engine, is used to heat an interior of the vehicle.

However, because the vehicle using the fuel cell does not generate as much heat as the engine generates, there is a problem in that it is difficult to apply, to a fuel cell vehicle, a heating method performed by the vehicle using the engine.

Accordingly, in the related art, various studies are being conducted on a technology of using a heat pump as a heat source by adding the heat pump to an air conditioning system. Studies are also being conducted on a technology of heating the fuel cell vehicle with a separate heat source such as an electric heater.

The electric heater is widely used because the electric heater has an advantage of easily heating the coolant without significantly affecting the air conditioning system.

Depending on the heating method, the electric heater may be classified into an air heating heater for a vehicle configured to directly heat air to be blown toward the interior of the vehicle, and a coolant heating heater (or coolant heater) configured to heat a coolant.

In the case of the coolant heater in the related art, a cartridge heater having a heating element is mounted in a housing, and the coolant introduced into the housing is heated by the cartridge heater. Therefore, there is a problem in that it is difficult to sufficiently form a flow path for heating the coolant introduced into the housing (i.e., a route in which the coolant is heated by the cartridge heater). It is also difficult to improve fast-acting heating performance (the time taken to reach a maximum temperature) and heating efficiency to a certain level or higher.

Moreover, in the related art, because the cartridge heater needs to be merely turned on/off in order to heat the coolant to a target temperature, it is difficult to accurately control an output of the cartridge heater in accordance with a heating load.

Therefore, recently, various types of research have been conducted to improve the fast-acting heating performance and the heating efficiency of the coolant heater, but the research result is still insufficient. Accordingly, there is a need for development of a coolant heater with improved fast-acting heating performance and heating efficiency.

SUMMARY OF THE DISCLOSURE

The present disclosure has been made in an effort to provide a coolant heater for a vehicle with improved fast-acting heating performance and heating efficiency.

In particular, the present disclosure has also been made in an effort to ensure a sufficient flow path of a coolant, an improved efficiency in heating the coolant, and a reduction of time taken to heat the coolant.

The present disclosure has also been made in an effort to accurately control an output of a coolant heater in accordance with a heating load.

The present disclosure has also been made in an effort to prevent a coolant heater from being excessively heated and to improve stability and reliability.

In order to achieve the above-mentioned objects, an embodiment of the present disclosure provides a coolant heater for a vehicle. The coolant heater includes: a housing unit having an inlet part through which a coolant is introduced and an outlet part through which the coolant is discharged; a baffle assembly provided in an internal space of the housing unit and having a first flow path through which the coolant flows in a first direction and a second flow path through which the coolant, passing through the first flow path, flows in a second direction different from the first direction; a first heater part provided in the first flow path; and a second heater part provided in the second flow path.

This configuration is provided to improve a fast-acting heating performance and heating efficiency for a vehicle (e.g., a fuel cell vehicle).

In other words, in the related art, a cartridge heater having a heating element is mounted in the housing, and the coolant introduced into the housing is heated by the cartridge heater. Therefore, there is a problem in that it is difficult to sufficiently form a flow path for heating the coolant introduced into the housing (i.e., a route in which the coolant is heated by the cartridge heater). It is also difficult to improve fast-acting heating performance (the time taken to reach a maximum temperature) and heating efficiency to a certain level or higher.

In contrast, according to the present disclosure, the first and second flow paths, which are directed in opposite directions, are formed in the housing unit, and the coolant is heated sequentially through the first flow path and the second flow path, such that a flow path through which the coolant is heated may be sufficiently ensured. As a result, it is possible to obtain an advantageous effect of improving a fast-acting heating performance and heating efficiency.

Furthermore, according to the present disclosure, since the coolant is primarily heated by a first sheath heater and a second sheath heater while spirally flowing around the baffle assembly through the first flow path and the second flow path and then secondarily heated again by a third heater, it is possible to obtain an advantageous effect of improving efficiency in transferring heat to the coolant and reducing the heating time.

The housing unit may have various structures and shapes in accordance with required conditions and design specifications, and the present disclosure is not restricted or limited by the structure and the shape of the housing unit.

As an example, the housing unit may include: a first housing configured to receive therein the baffle assembly; a first cover coupled to one end of the first housing; a second housing disposed to surround the first housing; a second cover coupled to one end of the second housing so as to cover the first cover; a header plate coupled to the other end of the first housing and the other end of the second housing; and a controller cover coupled to the header plate.

The baffle assembly may divide the internal space of the first housing into a first space which communicates with the inlet part and a second space which communicates with the outlet part. The baffle assembly may further divide the first space into the first flow path disposed in the first direction and the second flow path disposed in the second direction different from the first direction.

As described above, the coolant, which is introduced into the first housing through the inlet part, flows in the first space sequentially through the first flow path and the second flow path, such that a sufficient flow path of the coolant may be ensured. As a result, it is possible to obtain an advantageous effect of improving the efficiency in heating the coolant and reducing the time taken to heat the coolant.

The baffle assembly may have various structures capable of dividing the internal space of the first housing into a first space and a second space and further dividing the first space into a first flow path and a second flow path.

As an example, the baffle assembly may include: a baffle plate configured to divide the internal space of the housing unit into the first space which communicates with the inlet part and the second space which communicates with the outlet part; and a baffle shell connected to the baffle plate and configured to divide the first space into the first flow path and the second flow path.

More specifically, the baffle shell may be formed to have a hollow cross-sectional shape and disposed in a longitudinal direction of the housing unit, one end of the baffle shell may penetrate the baffle plate, an inlet hole may be formed at the other end of the baffle shell, the first flow path may be formed between the baffle shell and the housing unit, and the second flow path may be formed along the inside of the baffle shell.

In particular, the baffle shell may be disposed in the internal space of the first housing so as to be placed coaxially with the first housing. The first flow path may be formed around the baffle shell.

Since the baffle shell is disposed in the first housing so as to be placed coaxially with the first housing as described above, the first flow path formed around the baffle shell may have a uniform cross-sectional area. As a result, it is possible to obtain an advantageous effect of minimizing a heating deviation between the coolants passing through the first flow path and of improving a heating performance.

More particularly, the inlet part may be formed adjacent to one end of the baffle shell. The coolant introduced into the inlet part may flow along the first flow path and then may be introduced into the second flow path through the inlet hole formed at the other end of the baffle shell.

As described above, an arrangement interval, or distance, between the inlet part and the inlet hole is sufficiently provided, such that the coolant introduced into the inlet part sufficiently may flow along the first flow path and then may be introduced into the second flow path through the inlet hole. As a result, it is possible to obtain an advantageous effect of further improving efficiency in transferring heat to the coolant.

Various heating means capable of heating the coolant may be used as the first heater part.

As an example, the first heater part may include a first sheath heater formed as a coil and disposed in the first flow path. The first heater part may also include a second sheath heater formed as a coil and disposed in the first flow path.

In particular, the first sheath heater and the second sheath heater may be coaxially disposed in the longitudinal direction of the first flow path (in the longitudinal direction of the first housing). The coolant may sequentially pass through the first sheath heater and the second sheath heater.

Since the plurality of sheath heaters constitutes the first heater part as described above, only some or all of the plurality of sheath heaters may be operated in accordance with the required conditions (e.g., a heating load). As a result, it is possible to obtain an advantageous effect of precisely and quickly controlling an output of the coolant heater in accordance with the heating load.

In addition, the coolant heater may include first support parts configured to support the first sheath heater and the second sheath heater.

As an example, the first support parts may protrude from an outer surface of the baffle shell and may be in close contact with an inner surface of the first sheath heater and an inner surface of the second sheath heater.

Since the inner surface of the first sheath heater and the inner surface of the second sheath heater are supported by the first support parts as described above, it is possible to obtain an advantageous effect of further stably maintaining the state in which the first sheath heater and the second sheath heater are disposed.

Various heating means capable of heating the coolant may be used as the second heater part.

As an example, the second heater part may include a third sheath heater formed as a coil and disposed in the second flow path.

In addition, the baffle assembly may include a second support part configured to support the third sheath heater.

As an example, the second support part may protrude from an inner surface of the baffle shell and may be in close contact with an outer surface of the third sheath heater.

Since the outer surface of the third sheath heater is supported by the second support part as described above, it is possible to obtain an advantageous effect of further stably maintaining the state in which the third sheath heater is disposed.

According to an embodiment of the present disclosure, the coolant heater for a vehicle may include a controller configured to individually control the first sheath heater, the second sheath heater, and the third sheath heater.

As an example, the controller may be integrally coupled to one end of the housing unit.

Particularly, the controller is configured to individually control the first sheath heater, the second sheath heater, and the third sheath heater by pulse width modulation (PWM) control.

Since the first sheath heater, the second sheath heater, and the third sheath heater are individually controlled by PWM control as described above, it is possible to obtain an advantageous effect of precisely controlling outputs of the first sheath heater, the second sheath heater, and the third sheath heater.

In other words, in the related art, because the cartridge heater needs to be merely turned on/off by using a relay in order to heat the coolant to a target temperature, it is difficult to accurately control an output of the cartridge heater in accordance with a heating load.

However, according to the present disclosure, since the first sheath heater, the second sheath heater, and the third sheath heater are individually controlled by PWM control, it is possible to obtain an advantageous effect of accurately controlling the outputs of the first sheath heater, the second sheath heater, and the third sheath heater in accordance with a heating load. This results in minimizing electric power consumed by the first sheath heater, the second sheath heater, and the third sheath heater, and improving a traveling distance of the fuel cell vehicle.

In addition, according to the present disclosure, each of the first sheath heater, the second sheath heater, and the third sheath heater constitutes an independent electric circuit. For example, even though any one of the first sheath heater, the second sheath heater, and the third sheath heater may be broken down (e.g., short-circuited), the remaining two sheath heaters may operate. As a result, it is possible to obtain an advantageous effect of minimizing complaints related to the heating performance and caused by the occurrence of breakdown.

According to an embodiment of the present disclosure, the operations of the first sheath heater, the second sheath heater, and the third sheath heater may be stopped when the first sheath heater, the second sheath heater, and the third sheath heater are overheated.

As an example, the coolant heater for a vehicle may include a coolant temperature sensor configured to measure an outlet temperature of the coolant discharged from the outlet part. When the outlet temperature of the coolant is higher than a predetermined temperature, the controller stops the operations of the first sheath heater, the second sheath heater, and the third sheath heater.

As another example, the coolant heater for a vehicle may include a surface temperature sensor configured to measure a temperature of an outer surface of the housing unit. When the coolant is heated and the temperature of the outer surface of the housing unit is higher than the predetermined temperature, the controller stops the operations of the first sheath heater, the second sheath heater, and the third sheath heater.

In addition, when the temperature of the outer surface of the housing unit is higher than the outlet temperature of the coolant, the controller determines that overheating occurs, and thus the controller stops the operations of the first sheath heater, the second sheath heater, and the third sheath heater.

As still another example, the coolant heater for a vehicle may include a water pump configured to supply the coolant to the inlet part. When an abnormal signal related to the water pump is detected, the controller stops the operations of the first sheath heater, the second sheath heater, and the third sheath heater.

Alternatively, a thermal fuse may be connected to the housing unit. When the coolant is heated and the temperature of the outer surface of the housing unit is higher than an operating temperature of the thermal fuse, the thermal fuse may physically cut off a supply of power to the first sheath heater, the second sheath heater, and the third sheath heater.

According to an embodiment of the present disclosure, a thermal insulation layer may be formed between an outer surface of the first housing and an inner surface of the second housing.

In particular, the thermal insulation layer may be configured as an air layer or a vacuum layer.

As described above, since the thermal insulation layer is formed between the outer surface of the first housing and the inner surface of the second housing, a thermal loss to the outside of the second housing may be minimized. As a result, it is possible to obtain an advantageous effect of improving the efficiency in heating the coolant and of reducing the time taken to heat the coolant.

According to an embodiment of the present disclosure, the first sheath heater, the second sheath heater, and the third sheath heater may be fixed to the baffle assembly and the first housing by welding or brazing.

According to an embodiment of the present disclosure, the first sheath heater, the second sheath heater, and the third sheath heater may be fixed to the header plate by welding or brazing.

According to an embodiment of the present disclosure, a sealing member may be interposed between the header plate and the other end of the first housing and the other end of the second housing.

DETAILED DESCRIPTION

Figure 1:
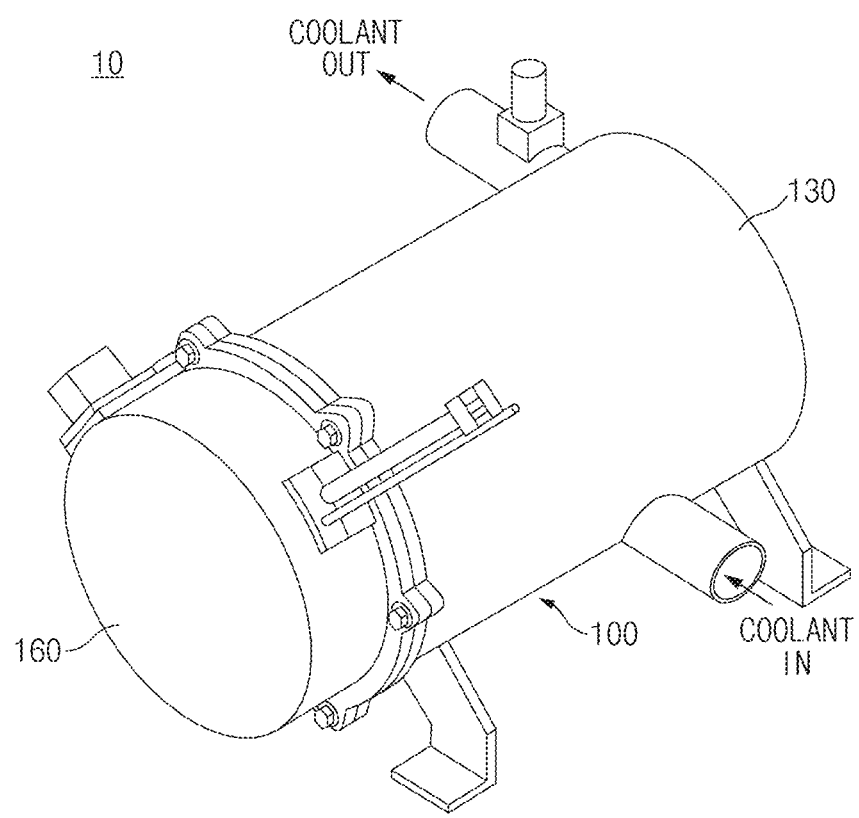
FIG. 1 is a perspective view of a coolant heater for a vehicle according to the present disclosure.

Hereinafter, embodiments of the present disclosure are described in detail with reference to the accompanying drawings, but the present disclosure is not restricted or limited by the embodiments. For reference, like reference numerals denote substantially identical elements in the present description. The description may be made under this rule by incorporating the contents illustrated in other drawings, and the contents repeated or determined as being understood to those having ordinary skill in the art may be omitted.

When an element or component in the written description and/or claims is identified and described as having a purpose or performing or carrying out a stated function, step, set of instructions, or the like, the element or component may also be considered as being "configured to" do so.

Figure 2:
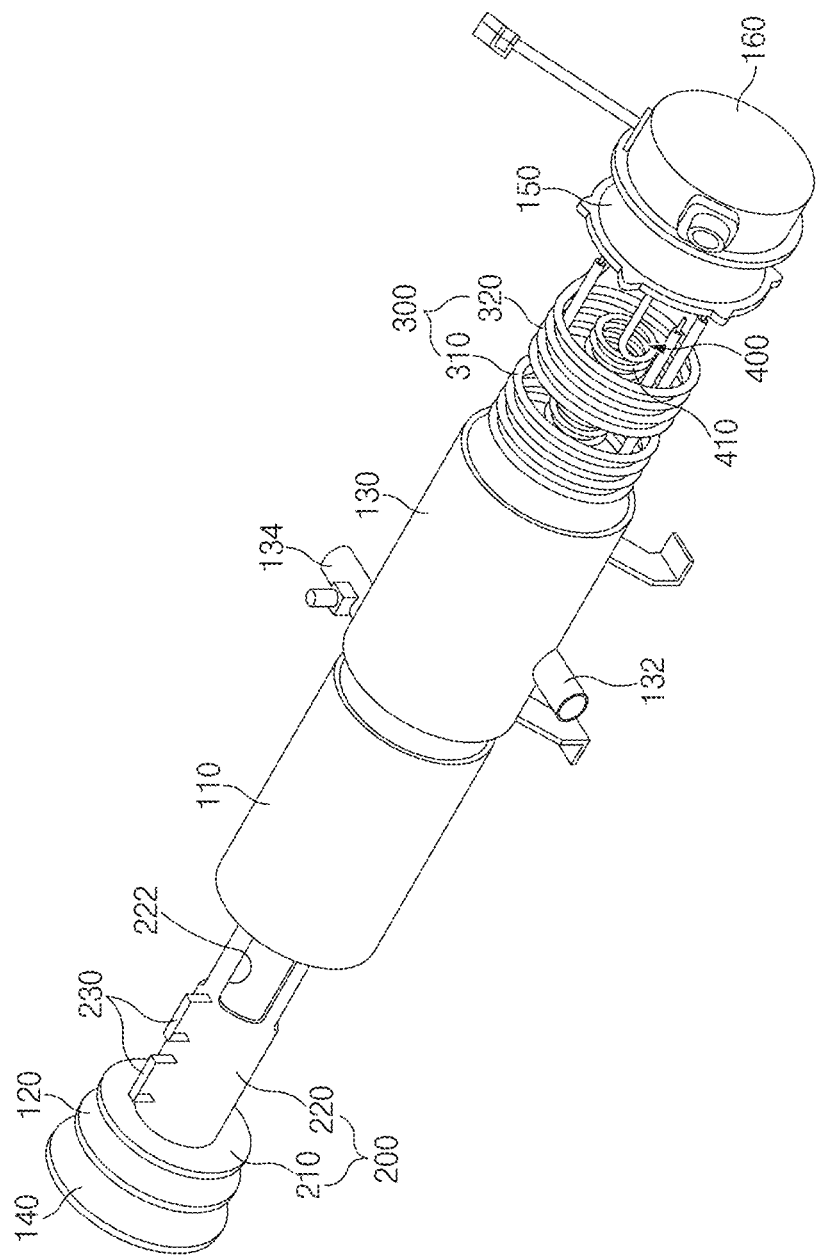
FIG. 2 is an exploded perspective view of the coolant heater for a vehicle according to the present disclosure.
Figure 3:
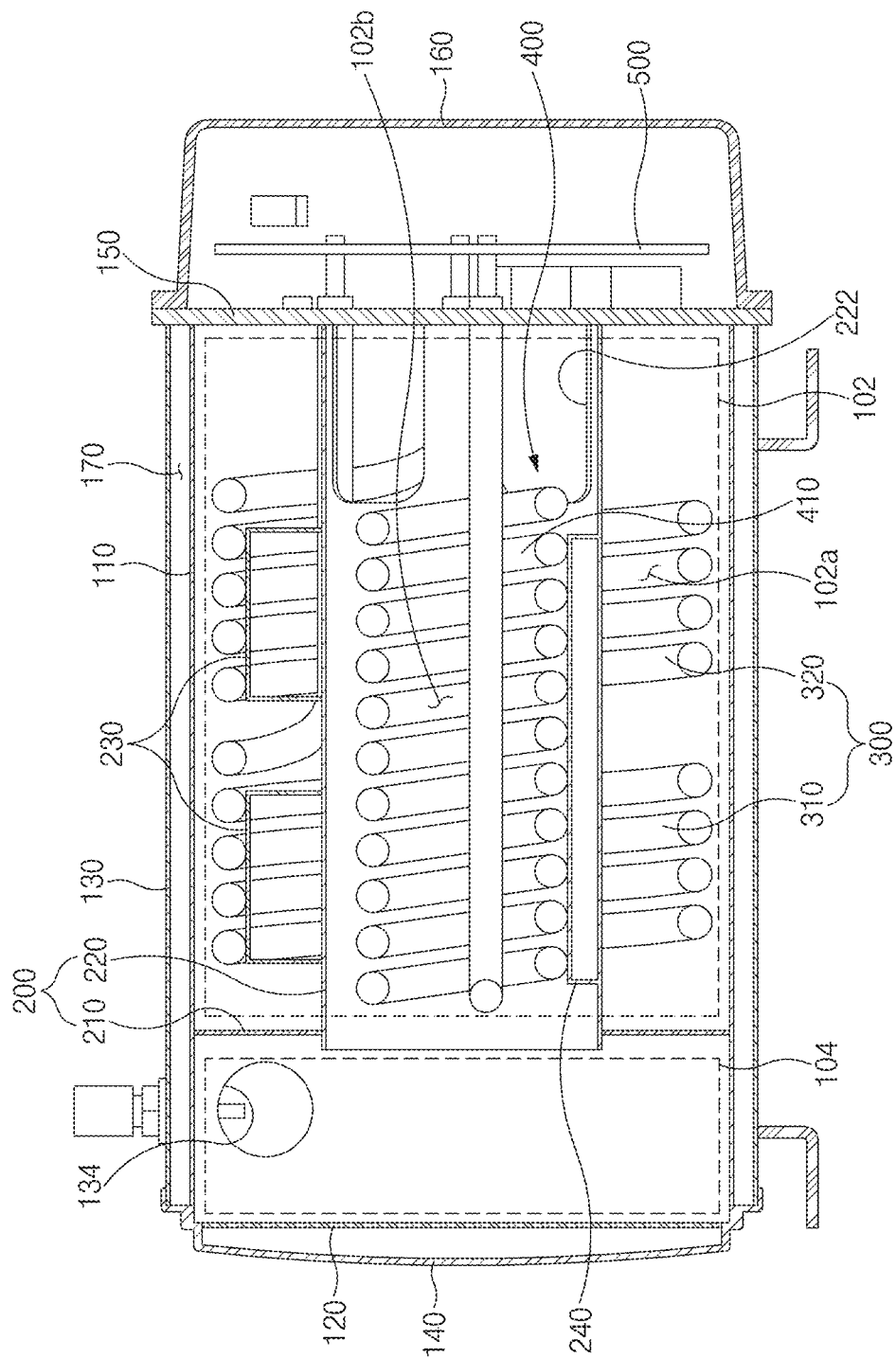
FIG. 3 is a cross-sectional view of the coolant heater for a vehicle according to the present disclosure.
Figure 4:
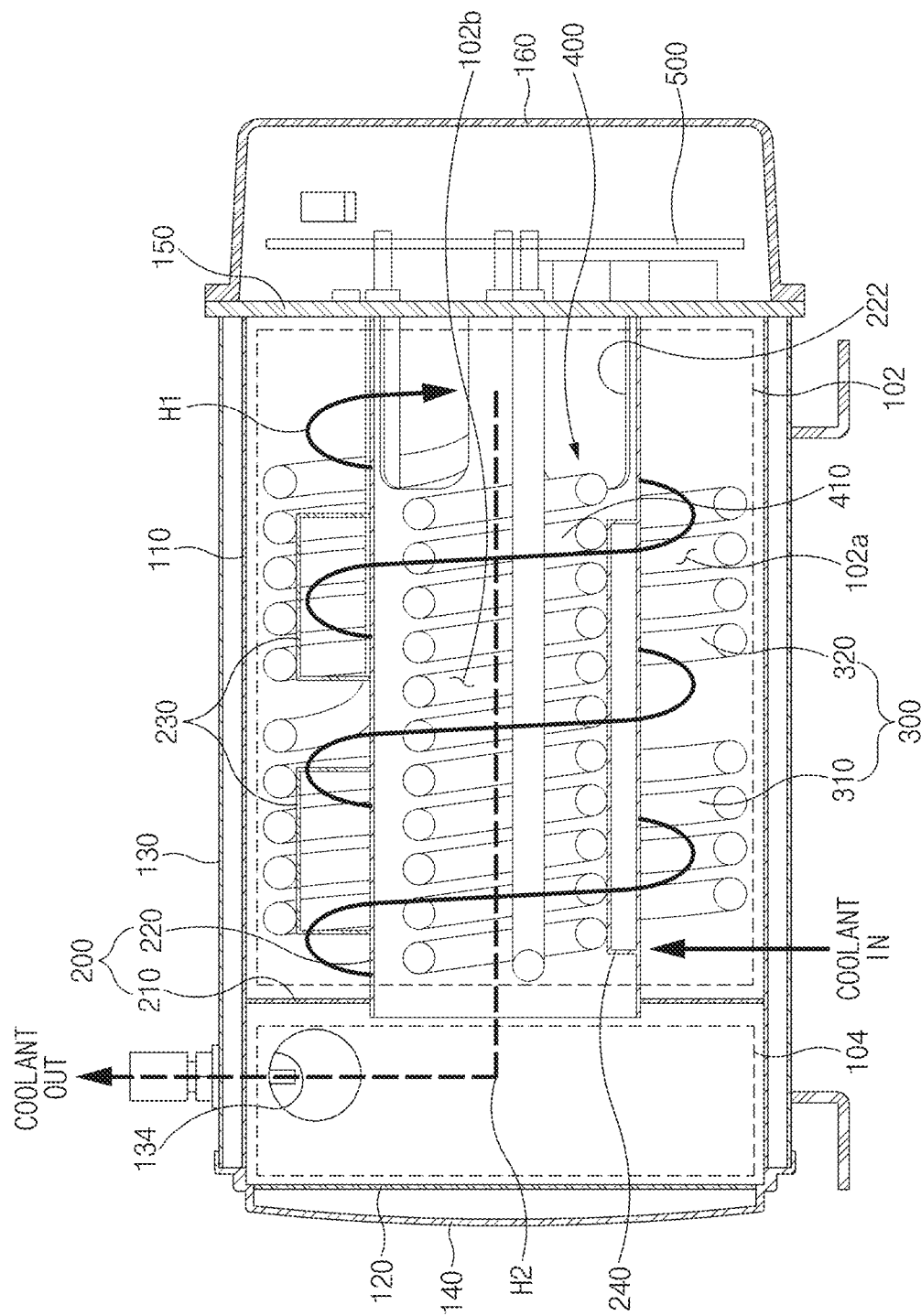
FIG. 4 is a view of a flow path of a coolant in the coolant heater for a vehicle according to the present disclosure.
Figure 5:
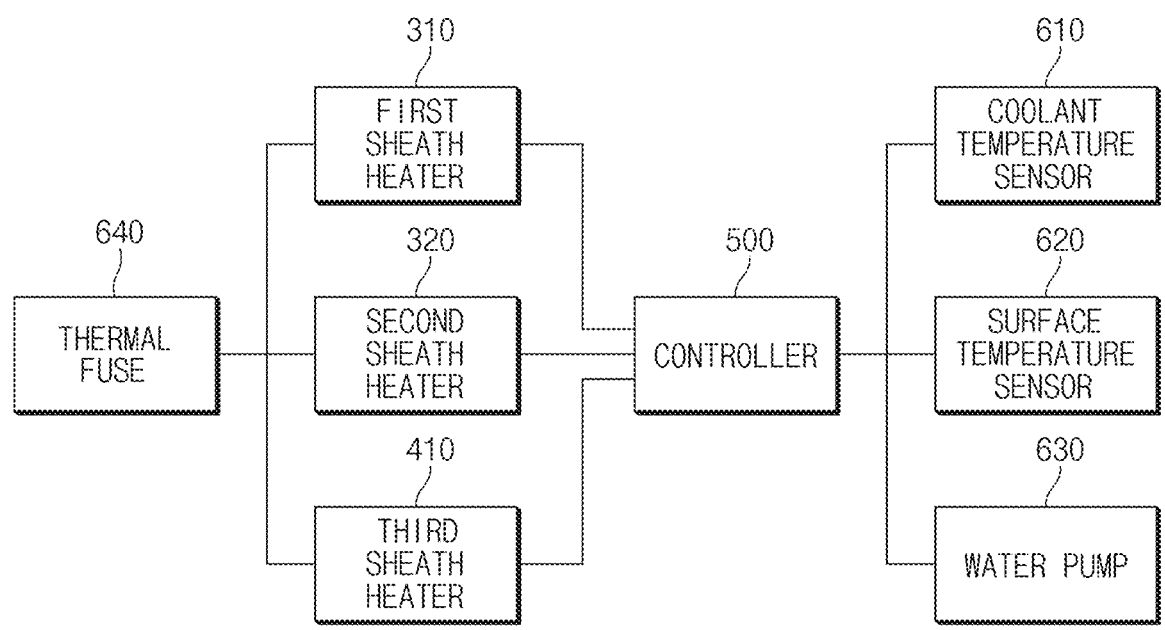
FIG. 5 is a diagram of a coolant temperature sensor and a surface temperature sensor of the coolant heater for a vehicle according to the present disclosure.
Figure 6:
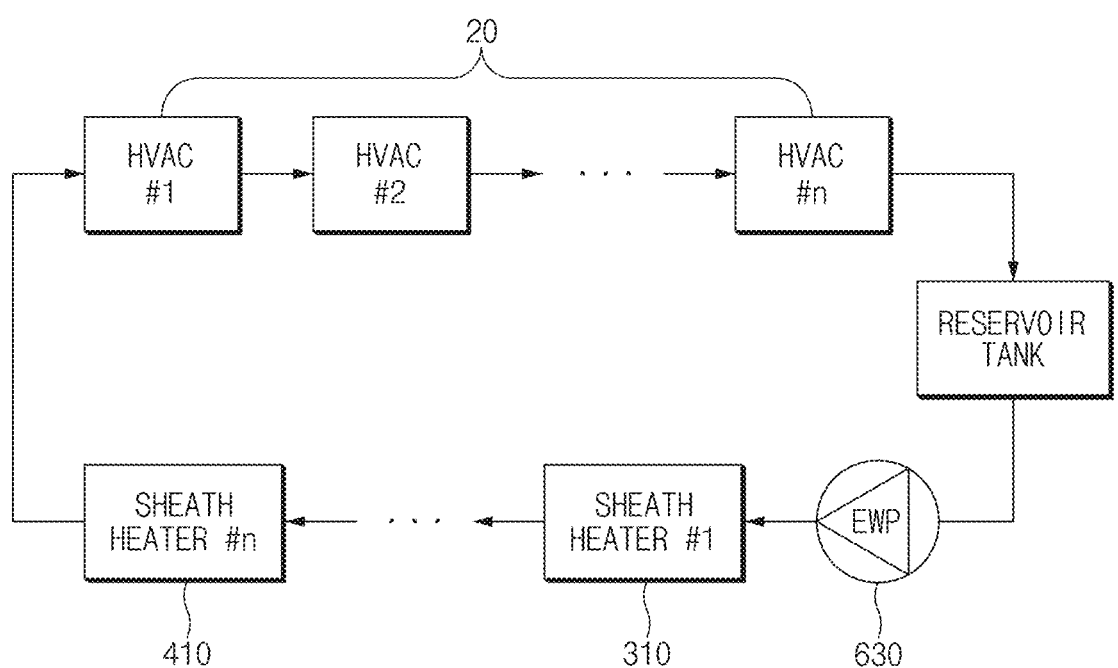
FIG. 6 is a diagram of a water pump of the coolant heater for a vehicle according to the present disclosure.
Figure 7:
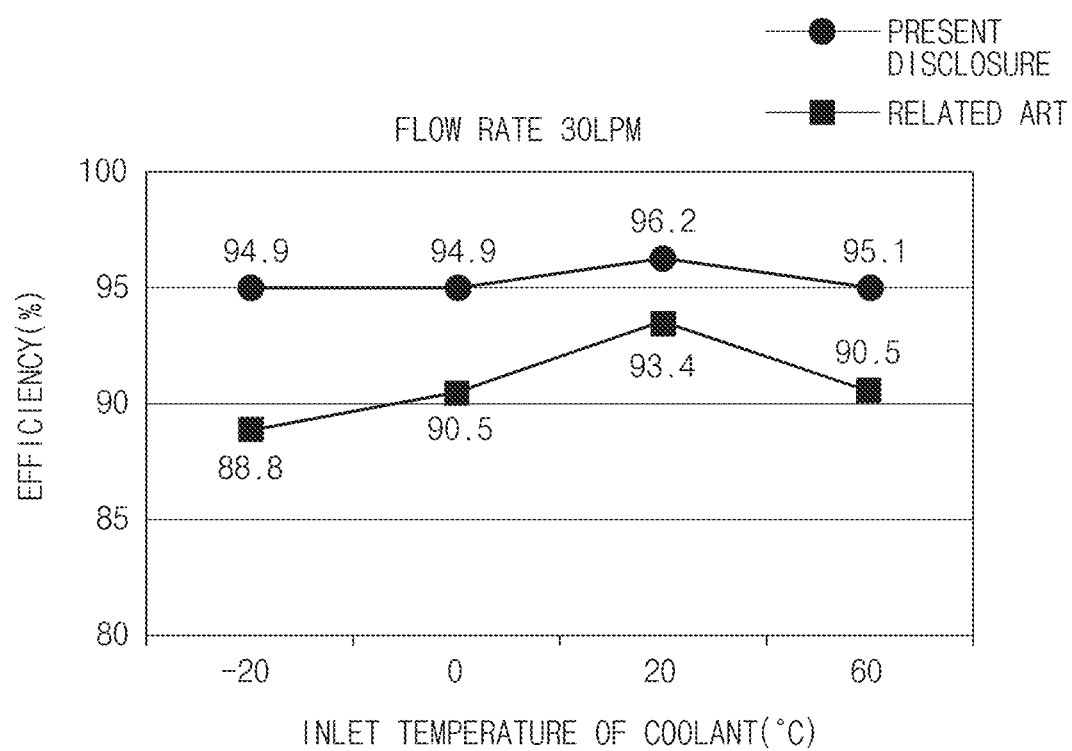
FIGS. 7 and 8 are charts illustrating efficiency in accordance with inlet temperatures of the coolant in the coolant heater for a vehicle according to the present disclosure.
Figure 8:
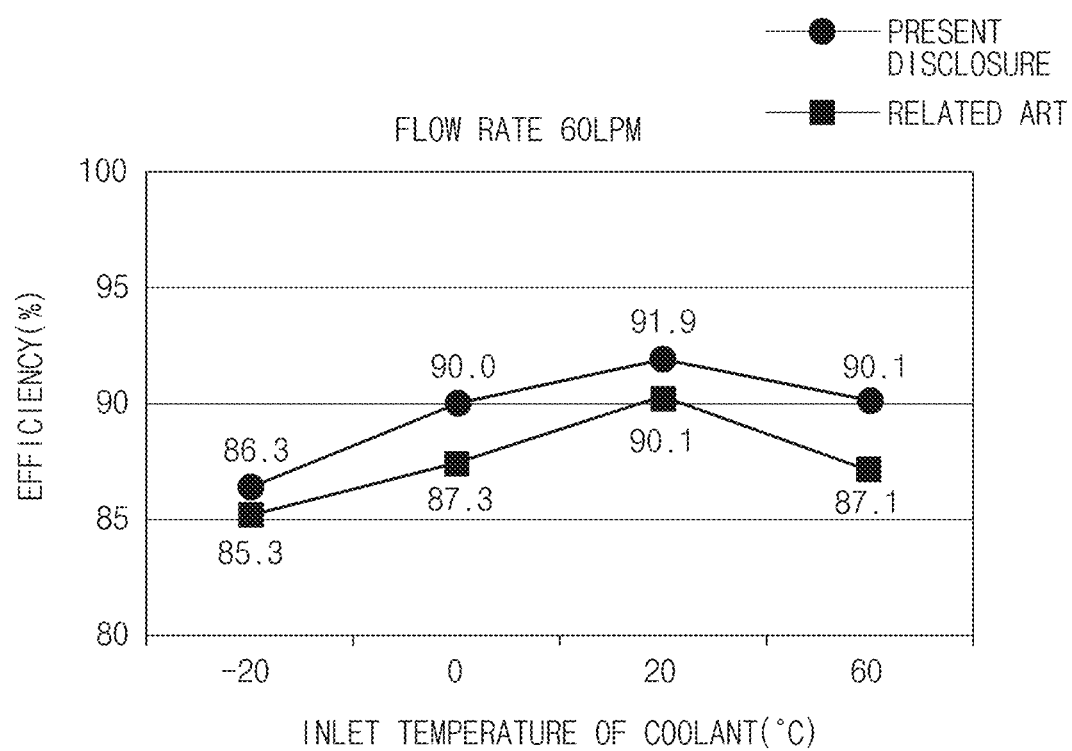
Figure 9:
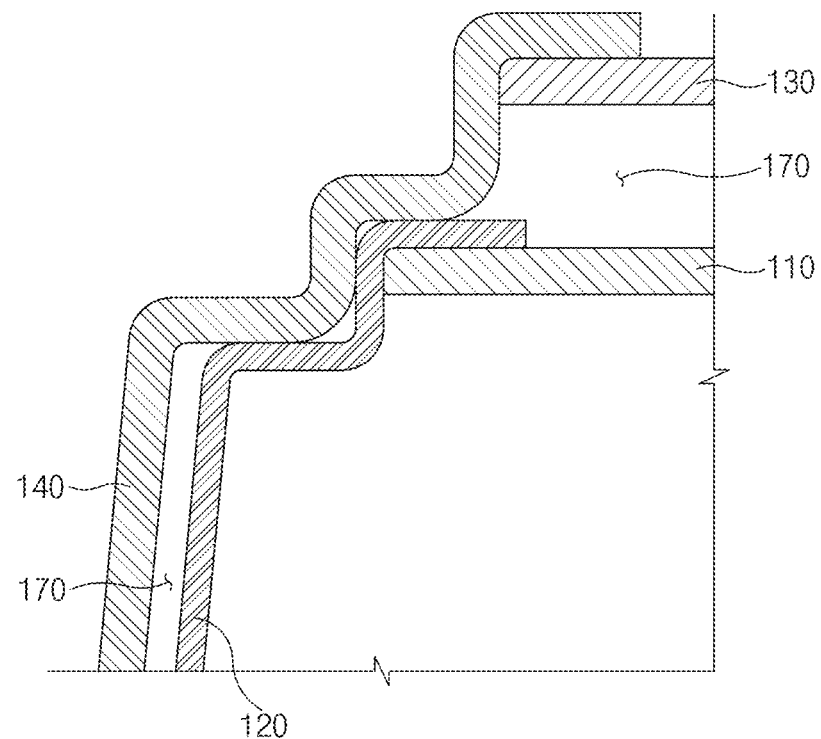
FIG. 9 is a view of a thermal insulation layer of the coolant heater for a vehicle according to the present disclosure.
Figure 10:
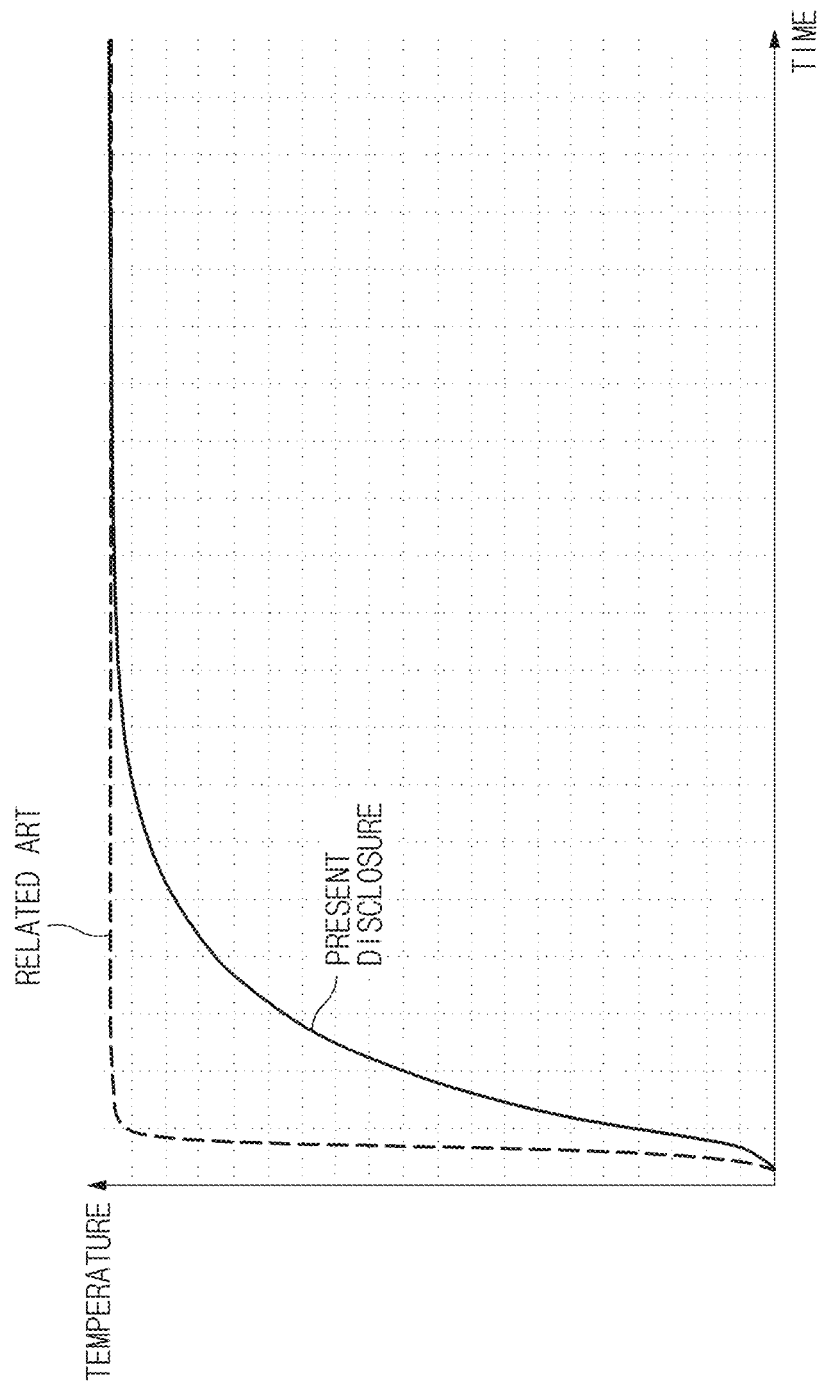
FIG. 10 is a chart illustrating a temperature of an outer wall of a housing unit in accordance with the presence and absence of the thermal insulation layer in the coolant heater for a vehicle according to the present disclosure.

FIG. 1 is a perspective view for explaining a coolant heater for a vehicle according to the present disclosure. FIG. 2 is an exploded perspective view for explaining the coolant heater for a vehicle according to the present disclosure. FIG. 3 is a cross-sectional view for explaining the coolant heater for a vehicle according to the present disclosure. In addition, FIG. 4 is a view for explaining a flow path of a coolant in the coolant heater for a vehicle according to the present disclosure. FIG. 5 is a diagram for explaining a coolant temperature sensor and a surface temperature sensor of the coolant heater for a vehicle according to the present disclosure and FIG. 6 is a diagram for explaining a water pump of the coolant heater for a vehicle according to the present disclosure. Further, FIGS. 7 and 8 are charts for explaining efficiency in accordance with inlet temperatures of the coolant in the coolant heater for a vehicle according to the present disclosure. FIG. 9 is a view for explaining a thermal insulation layer of the coolant heater for a vehicle according to the present disclosure, and FIG. 10 is a chart for explaining a temperature of an outer wall of a housing unit in accordance with the presence and absence of the thermal insulation layer in the coolant heater for a vehicle according to the present disclosure.

Referring to FIGS. 1-9, a coolant heater 10 for a vehicle according to the present disclosure includes: a housing unit 100 having an inlet part 132 through which a coolant is introduced and an outlet part 134 through which the coolant is discharged; a baffle assembly 200 provided in an internal space of the housing unit 100 and having a first flow path 102a through which the coolant flows in a first direction and a second flow path 102b through which the coolant, passing through the first flow path 102a, flows in a second direction different from the first direction; a first heater part 300 provided in the first flow path 102a; and a second heater part 400 provided in the second flow path 102b.

For reference, the coolant heater 10 for a vehicle according to the present disclosure is used to heat a coolant of a fuel cell vehicle and use the heated coolant for heating. As an example, the coolant heater 10 for a vehicle is configured to heat a coolant to be introduced into a heater core (not illustrated) of an HVAC (heating, ventilation, and air conditioning) unit (20 in FIG. 6) for a fuel cell vehicle.

The housing unit 100 is formed to have therein a predetermined receiving space (internal space). The inlet part 132 through which the coolant is introduced is provided at one side of the housing unit 100. The outlet part 134 through which the coolant is discharged is provided at the other side of the housing unit 100.

The housing unit 100 may have various structures and shapes in accordance with required conditions and design specifications, and the present disclosure is not restricted or limited by the structure and the shape of the housing unit 100.

As an example, the housing unit 100 includes a first housing 110 configured to receive therein the baffle assembly 200, a first cover 120 coupled to one end of the first housing 110, a second housing 130 disposed to surround the first housing 110, a second cover 140 coupled to one end of the second housing 130 so as to cover the first cover 120, a header plate 150 coupled to the other end of the first housing 110 and the other end of the second housing 130, and a controller cover 160 coupled to the header plate 150 so as to protect a controller 500.

The first housing 110 is formed in a hollow cylindrical shape opened at both ends thereof. An inlet hole (not illustrated), which communicates with the inlet part 132, is formed at one side of the first housing 110. An outlet hole (not illustrated), which communicates with the outlet part 134, is formed at the other side of the first housing 110.

The baffle assembly 200 is provided in the first housing 110. The internal space of the first housing 110 may be divided, by the baffle assembly 200, into a first space 102 which communicates with the inlet part 132 and a second space 104 which communicates with the outlet part 134. The first space 102 is further divided into the first flow path 102a and the second flow path 102b.

The first cover 120 is formed as an approximately circular plate and coupled to the first housing 110 in order to block an opening portion formed at one end (a left end based on FIG. 2) of the first housing 110.

In particular, because the coolant is introduced into the first housing 110 and discharged from the first housing 110, the first housing 110 and the first cover 120 are coupled to each other to form a sealed structure capable of preventing a leak of the coolant.

As an example, the first housing 110 and the first cover 120 are fixed by welding or brazing.

The second housing 130 has a larger diameter than the first housing 110. The second housing 130 is formed in a hollow cylindrical shape opened at both ends thereof. The second housing 130 is disposed to surround the first housing 110. The inlet part 132 (e.g., an inlet pipe) through which the coolant is introduced is provided at one side of the second housing 130. The outlet part 134 (e.g., an outlet pipe) through which the coolant is discharged is provided at the other side of the second housing 130.

The second cover 140 is formed as an approximately circular plate and coupled to the second housing 130 in order to block the opening portion formed at one end (the left end based on FIG. 2) of the second housing 130.

The header plate 150 is formed as an approximately circular plate and coupled to the first housing 110 and the second housing 130 in order to block an opening portion formed at the other end of the first housing 110 and an opening portion formed at the other end of the second housing 130.

In particular, because the coolant is introduced into the first housing 110 and discharged from the first housing 110, the first housing 110 and the header plate 150 are coupled to each other to form a sealed structure capable of preventing a leak of the coolant.

As an example, the first housing 110 and the header plate 150 are fixed by welding or brazing.

Further, the controller cover 160 is connected to the header plate 150 so as to cover the controller 500, thereby protecting the controller 500.

The baffle assembly 200 is configured to divide the internal space of the first housing 110 into the first space 102 which communicates with the inlet part 132 and the second space 104 which communicates with the outlet part 134. The baffle assembly 200 also divides the first space 102 into the first flow path 102a disposed in the first direction and the second flow path 102b disposed in the second direction different from the first direction.

As described above, the coolant, which is introduced into the first housing 110 through the inlet part 132, flows in the first space 102 sequentially through the first flow path 102a and the second flow path 102b, such that a sufficient flow path of the coolant may be ensured. As a result, it is possible to obtain an advantageous effect of improving the efficiency in heating the coolant and reducing the time taken to heat the coolant.

The baffle assembly 200 may have various structures capable of dividing the internal space of the first housing 110 into the first space 102 and the second space 104 and further dividing the first space 102 into the first flow path 102a and the second flow path 102b.

As an example, the baffle assembly 200 includes: a baffle plate 210 configured to divide the internal space of the housing unit 100 into the first space 102 which communicates with the inlet part 132 and the second space 104 which communicates with the outlet part 134; and a baffle shell 220 connected to the baffle plate 210 and configured to divide the first space 102 into the first flow path 102a and the second flow path 102b.

The baffle plate 210 is formed in a circular-plate shape having a diameter corresponding to an inner diameter of the first housing 110. The baffle plate 210 is vertically mounted in the internal space of the first housing 110 so as to be disposed between the inlet part 132 and the outlet part 134.

The internal space of the first housing 110 may be divided, by the baffle plate 210, into the first space 102 (a space at a right side of the baffle plate based on FIG. 3) which communicates with the inlet part 132, and the second space 104 (a space at a left side of the baffle plate based on FIG. 3) which communicates with the outlet part 134.

In particular, in order to maximally ensure the first space 102 in which the coolant is heated in the first housing 110, the inlet part 132 and the outlet part 134 may be provided adjacent to one end (a left end based on FIG. 3) of the first housing 110.

The baffle shell 220 is connected to the baffle plate 210 and may have various structures capable of dividing the first space 102 into the first flow path 102a and the second flow path 102b.

As an example, the baffle shell 220 is formed to have a hollow cross-sectional shape (e.g., a hollow cylindrical shape) and disposed in a longitudinal direction of the housing unit 100. One end of the baffle shell 220 may penetrate the baffle plate 210. An inlet hole 222 may be formed at the other end of the baffle shell 220. The first flow path 102a may be provided between the baffle shell 220 and the housing unit 100. The second flow path 102b may be provided along the inside of the baffle shell 220.

In particular, the baffle shell 220 is disposed in the internal space of the first housing 110 so as to be placed coaxially with the first housing 110. The first flow path 102a is formed around the baffle shell 220.

Since the baffle shell 220 is disposed in the first housing 110 so as to be placed coaxially with the first housing 110 as described above, the first flow path 102a formed around the baffle shell 220 may have a uniform cross-sectional area. As a result, it is possible to obtain an advantageous effect of minimizing a heating deviation between the coolants passing through the first flow path 102a and of improving a heating performance.

More particularly, the inlet part 132 is provided adjacent to one end (e.g., the left end) of the baffle shell 220. The coolant introduced into the inlet part 132 flows along the first flow path 102a and then is introduced into the second flow path 102b through the inlet hole 222 formed at the other end (e.g., the right end) of the baffle shell 220.

As described above, there is provided a sufficient arrangement interval, or distance, between the inlet part 132 and the inlet hole 222, such that the coolant introduced into the inlet part 132 sufficiently may flow along the first flow path 102a and then may be introduced into the second flow path 102b through the inlet hole 222. As a result, it is possible to obtain an advantageous effect of further improving efficiency in transferring heat to the coolant.

In addition, the baffle shell 220 is formed to entirely have a uniform cross-sectional area in the longitudinal direction thereof. Since the baffle shell 220 entirely has a uniform cross-sectional area as described above, the second flow path 102b formed along the inside of the baffle shell 220 may have a uniform cross-sectional area. As a result, it is possible to obtain an advantageous effect of minimizing the heating deviation between the coolants passing through the second flow path 102b, minimizing a local deterioration in flow velocity, and improving the heating performance.

The first heater part 300 is disposed in the first flow path 102a and configured to heat the coolant flowing along the first flow path 102a.

Various heating means capable of heating the coolant may be used as the first heater part 300, and the present disclosure is not restricted or limited by the type and the structure of the first heater part 300.

In particular, the first heater part 300 may be configured by using a sheath heater.

For reference, in the present disclosure, the term 'sheath heater' refers to a tubular heater configured such that an electric heating wire is embedded in a coil shape inside a metallic protective tube. The protective tube is filled with insulation powder made of magnesium oxide in order to insulate the electric heating wire and the protective tube. The advantage of the sheath heater is that the sheath heater may be robust against external physical impact, may improve efficiency of electrical and thermal energy, and may be freely formed in various shapes in accordance with required conditions.

As an example, the first heater part 300 includes a first sheath heater 310 formed as a coil and disposed in the first flow path 102a. The first heater part 300 also includes a second sheath heater 320 formed as a coil and disposed in the first flow path 102a.

More specifically, the first sheath heater 310 is formed as a coil surrounding the baffle shell 220 and disposed between the baffle shell 220 and the first housing 110.

The second sheath heater 320 is formed as a coil surrounding the baffle shell 220 and disposed between the baffle shell 220 and the first housing 110.

In particular, the first sheath heater 310 and the second sheath heater 320 are coaxially disposed in the longitudinal direction of the first flow path 102a (in the longitudinal direction of the first housing 110). The coolant may sequentially pass through the first sheath heater 310 and the second sheath heater 320.

Since the plurality of sheath heaters constitutes the first heater part 300 as described above, only some or all of the plurality of sheath heaters may be operated in accordance with the required conditions (e.g., a heating load). As a result, it is possible to obtain an advantageous effect of precisely and quickly controlling an output of the coolant heater in accordance with the heating load.

More particularly, the first sheath heater 310 and the second sheath heater 320 are fixed to the first housing 110 by welding or brazing. Since the first sheath heater 310 and the second sheath heater 320 are fixed to the first housing 110 by welding or brazing as described above, it is possible to obtain an advantageous effect of stably maintaining the state in which the first sheath heater 310 and the second sheath heater 320 are disposed.

In addition, the baffle assembly 200 may include first support parts 230 configured to support the first sheath heater 310 and the second sheath heater 320.

As an example, the first support parts 230 may protrude from an outer surface of the baffle shell 220 and may be in close contact with an inner surface of the first sheath heater 310 and an inner surface of the second sheath heater 320.

Since the inner surface of the first sheath heater 310 and the inner surface of the second sheath heater 320 are supported by the first support parts 230 as described above, it is possible to obtain an advantageous effect of further stably maintaining the state in which the first sheath heater 310 and the second sheath heater 320 are disposed.

More particularly, the first sheath heater 310 and the second sheath heater 320 are fixed to the first support part 230 by welding or brazing.

The second heater part 400 is disposed in the second flow path 102b and configured to heat the coolant flowing along the second flow path 102b.

Various heating means capable of heating the coolant may be used as the second heater part 400, and the present disclosure is not restricted or limited by the type and the structure of the second heater part 400.

As an example, the second heater part 400 includes a third sheath heater 410 formed as a coil and disposed in the second flow path 102b.

For reference, in an embodiment of the present disclosure, the configuration in which only the single third sheath heater 410 is provided in the second flow path 102b is described as an example. However, according to another embodiment of the present disclosure, a plurality of third sheath heaters may be provided in the second flow path, and the present disclosure is not restricted or limited by the number of third sheath heaters and an arrangement interval or distance between the third sheath heaters.

In addition, the baffle assembly 200 may include a second support part 240 configured to support the third sheath heater 410.

As an example, the second support part 240 may protrude from an inner surface of the baffle shell 220 and may be in close contact with an outer surface of the third sheath heater 410.

Since the outer surface of the third sheath heater 410 is supported by the second support part 240 as described above, it is possible to obtain an advantageous effect of further stably maintaining the state in which the third sheath heater 410 is disposed.

More particularly, the third sheath heater 410 is fixed to the second support part 240 by welding or brazing.

With this structure, the coolant introduced into the inlet part 132 is primarily heated by the first sheath heater 310 and the second sheath heater 320 while flowing (H1) along the first flow path 102a. The coolant is secondarily heated again by the third sheath heater 410 while flowing (H2) along the second flow path 102b. Then the coolant is introduced into the heater core of the HVAC unit 20 of the fuel cell vehicle through the second space 104 in the first housing 110 and through the outlet part 134 (see FIG. 4).

As described above, according to the present disclosure, since the coolant is primarily heated by the first sheath heater 310 and the second sheath heater 320 while spirally flowing around the baffle assembly 200 through the first flow path 102a and the second flow path 102b and then secondarily heated again by the third sheath heater 310, it is possible to obtain an advantageous effect of improving efficiency in transferring heat to the coolant and reducing the heating time.

In other words, as illustrated in FIGS. 7 and 8, it can be seen that the efficiency in transferring heat to the coolant is improved compared to the related art because the coolant is heated while flowing in a zigzag pattern through the first flow path 102a and the second flow path 102b. As a result, it is possible to obtain an advantageous effect of reducing the time taken to heat the coolant and thus improving the fast-acting heating performance and the heating efficiency.

In addition, the coolant heater 10 for a vehicle according to the present disclosure includes the controller 500 configured to individually control the first sheath heater 310, the second sheath heater 320, and the third sheath heater 410.

The controller 500 may be mounted at various positions in accordance with required conditions and design specifications. As an example, the controller 500 may be integrally coupled to one end of the housing unit 100. More specifically, the controller 500 may be mounted on the header plate 150.

In an embodiment of the present disclosure, the configuration in which the controller 500 is integrally coupled to one end of the housing unit 100 is described as an example. However, according to another embodiment of the present disclosure, the controller 500 may be provided separately from the housing unit 100.

More particularly, the controller 500 is configured to individually control the first sheath heater 310, the second sheath heater 320, and the third sheath heater 410 by pulse width modulation (PWM) control.

Since the first sheath heater 310, the second sheath heater 320, and the third sheath heater 410 are individually controlled by PWM control as described above, it is possible to obtain an advantageous effect of precisely controlling outputs of the first sheath heater 310, the second sheath heater 320, and the third sheath heater 410.

In other words, in the related art, because the cartridge heater needs to be merely turned on/off by using a relay in order to heat the coolant to a target temperature, it is difficult to accurately control an output of the cartridge heater in accordance with a heating load.

However, according to the present disclosure, since the first sheath heater 310, the second sheath heater 320, and the third sheath heater 410 are individually controlled by PWM control, it is possible to obtain an advantageous effect of accurately controlling the outputs of the first sheath heater 310, the second sheath heater 320, and the third sheath heater 410 in accordance with a heating load. Other advantageous effects include minimizing electric power consumed by the first sheath heater 310, the second sheath heater 320, and the third sheath heater 410, and improving a traveling distance of the fuel cell vehicle.

In addition, according to the present disclosure, each of the first sheath heater 310, the second sheath heater 320, and the third sheath heater 410 constitutes an independent electric circuit. For example, even though any one of the first sheath heater 310, the second sheath heater 320, and the third sheath heater 410 may be broken down (e.g., short-circuited), the remaining two sheath heaters may operate. As a result, it is possible to obtain an advantageous effect of minimizing complaints related to the heating performance and caused by the occurrence of breakdown.

In particular, referring to FIGS. 5 and 6, the coolant heater 10 for a vehicle according to the present disclosure is configured to stop the operations of the first sheath heater 310, the second sheath heater 320, and the third sheath heater 410 when the first sheath heater 310, the second sheath heater 320, and the third sheath heater 410 are overheated.

The process of stopping the operations of the first sheath heater 310, the second sheath heater 320, and the third sheath heater 410 in the event of overheating may be implemented in various ways in accordance with required conditions and design specifications.

As an example, the coolant heater 10 for a vehicle may include a coolant temperature sensor 610 configured to measure an outlet temperature of the coolant discharged from the outlet part 134. When the outlet temperature of the coolant is higher than a predetermined temperature, the controller 500 stops the operations of the first sheath heater 310, the second sheath heater 320, and the third sheath heater 410.

As described above, since the operations of the first sheath heater 310, the second sheath heater 320, and the third sheath heater 410 are stopped when the outlet temperature of the coolant is higher than the predetermined temperature, it is possible to obtain an advantageous effect of preventing the overheating caused by a lack of coolant, minimizing damage to the first sheath heater 310, the second sheath heater 320, and the third sheath heater 410, and improving stability.

As another example, the coolant heater 10 for a vehicle may include a surface temperature sensor 620 configured to measure a temperature of an outer surface of the housing unit 100. When the coolant is heated and the temperature of the outer surface of the housing unit 100 is higher than the predetermined temperature, the controller 500 stops the operations of the first sheath heater 310, the second sheath heater 320, and the third sheath heater 410.

As described above, since the operations of the first sheath heater 310, the second sheath heater 320, and the third sheath heater 410 are stopped when the temperature of the outer surface of the housing unit 100 is higher than the predetermined temperature, it is possible to obtain an advantageous effect of preventing the overheating, minimizing damage to the first sheath heater 310, the second sheath heater 320, and the third sheath heater 410, and improving stability.

In addition, when the temperature of the outer surface of the housing unit 100 is higher than the outlet temperature of the coolant, the controller 500 determines that the overheating occurs, and thus the controller 500 stops the operations of the first sheath heater 310, the second sheath heater 320, and the third sheath heater 410.

As still another example, the coolant heater 10 for a vehicle may include a water pump 630 configured to supply the coolant to the inlet part 132. When an abnormal signal related to the water pump 630 is detected, the controller 500 stops the operations of the first sheath heater 310, the second sheath heater 320, and the third sheath heater 410.

In this case, the abnormal signal related to the water pump 630 may mean a signal that deviates from a reference signal range which is set when the water pump 630 normally operates.

Alternatively, a thermal fuse 640 may be connected to the housing unit 100. When the coolant is heated and the temperature of the outer surface of the housing unit 100 is higher than an operating temperature of the thermal fuse, the thermal fuse 640 may physically cut off a supply of power to the first sheath heater 310, the second sheath heater 320, and the third sheath heater 410.

Referring to FIGS. 3 and 9, a thermal insulation layer 170 may be formed between an outer surface of the first housing 110 and an inner surface of the second housing 130.

Various types of thermal insulation layers 170 may be formed in accordance with required conditions and design specifications, and the present disclosure is not restricted or limited by the type and the structure of the thermal insulation layer 170.

In particular, the thermal insulation layer 170 may be configured as an air layer or a vacuum layer. In some instances, instead of the air layer (vacuum layer), a thermal insulator made of a thermal insulating material may be provided between the outer surface of the first housing 110 and the inner surface of the second housing 130.

As an example, the first housing 110, the second housing 130, the first cover 120, the second cover 140, and the header plate 150 may form the thermal insulation layer 170 (e.g., air layer) in cooperation with one another.

As described above, since the thermal insulation layer 170 is formed between the outer surface of the first housing 110 and the inner surface of the second housing 130, a thermal loss to the outside of the second housing 130 may be minimized. As a result, it is possible to obtain an advantageous effect of improving the efficiency in heating the coolant and of reducing the time taken to heat the coolant.

Referring to FIG. 10, it can be seen that if no thermal insulation layer is provided between the outer surface of the first housing 110 and the inner surface of the second housing 130 (in the related art), a temperature of an outer wall of the second housing 130 is rapidly increased, which causes an increase in thermal loss to the outside of the second housing 130. In contrast, according to the present disclosure, since the thermal insulation layer 170 is provided between the outer surface of the first housing 110 and the inner surface of the second housing 130, a speed of raising the temperature of the outer wall of the second housing 130 may be reduced, as illustrated in FIG. 10. As a result, it is possible to reduce a thermal loss to the outside of the second housing 130.

Figure 11:
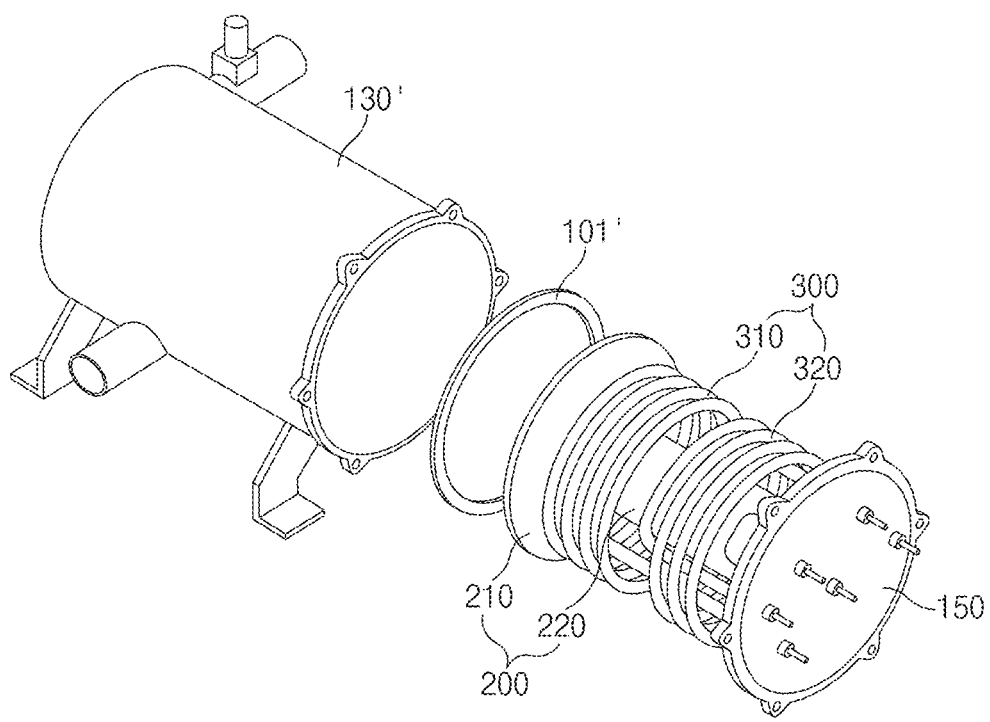
FIG. 11 is a view of a coolant heater for a vehicle according to another embodiment of the present disclosure.

FIG. 11 is a view for explaining a coolant heater for a vehicle according to another embodiment of the present disclosure. Further, the parts identical and corresponding to the parts in the above-mentioned configuration are designated by the identical or corresponding reference numerals, and detailed descriptions thereof have been omitted.

In the embodiment of the present disclosure described and illustrated above, there has been described the example in which the first and second covers 120 and 140 made of metal (e.g., stainless steel or aluminum) are fixed, by welding or brazing, to the first and second housings 110 and 130 made of metal. It has also been described in the example above that the first sheath heater 310, the second sheath heater 320, and the third sheath heater 410, which are made of metal, are fixed to the first and second housings 110 and 130 by welding or brazing. However, according to another embodiment of the present disclosure, the first cover 120, the second cover 140, the first housing 110, and the second housing 130 may be made of materials different from materials of the first sheath heater 310, the second sheath heater 320, and the third sheath heater 410.

As an example, referring to FIG. 11, the first and second covers 120 and 140 made of a nonmetal material (e.g., plastic) and the first and second housings 110 and 130 made of a nonmetal material (e.g., plastic) may be integrally formed by injection molding.

In addition, a sealing member 101' (for example, made of rubber or silicone) for defining a sealed structure may be interposed between the header plate 150 and the other end of a first housing (not illustrated) and the other end of a second housing 130'.

According to yet another embodiment of the present disclosure, in order to reduce a size of the coolant heater for a vehicle, the coolant heater for a vehicle may be configured only by the housing unit and the first heater part (or both the first heater part and the second heater part) without the separate baffle assembly. Alternatively, the housing unit may be configured only by the second housing without the separate first housing (including the thermal insulation layer).

According to the present disclosure as described above, it is possible to obtain an advantageous effect of improving a fast-acting heating performance and heating efficiency.

In particular, according to the present disclosure, it is possible to obtain an advantageous effect of ensuring a sufficient flow path of the coolant, improving efficiency in heating the coolant, and reducing the time taken to heat the coolant.

In addition, according to the present disclosure, it is possible to obtain an advantageous effect of accurately controlling the output of the coolant heater in accordance with a heating load.

In addition, according to the present disclosure, it is possible to obtain an advantageous effect of preventing the coolant heater from being excessively heated and of improving stability and reliability.

While the present disclosure has been described above with reference to the embodiments, it may be understood by those having ordinary skill in the art that the present disclosure may be variously modified and changed without departing from the spirit and scope of the present disclosure disclosed in the claims.

What is claimed is:

1. A coolant heater for a vehicle, the coolant heater comprising:
a housing unit having an inlet part through which a coolant is introduced and an outlet part through which the coolant is discharged;
a baffle assembly provided in an internal space of the housing unit and having a first flow path through which the coolant flows in a first direction and a second flow path through which the coolant, passing through the first flow path, flows in a second direction different from the first direction;
a first heater part provided in the first flow path; and
a second heater part provided in the second flow path,
wherein the baffle assembly comprises:
a baffle plate configured to divide the internal space of the housing unit into a first space which communicates with the inlet part and a second space which communicates with the outlet part; and
a baffle shell connected to the baffle plate and configured to divide the first space into the first flow path and the second flow path.

2. The coolant heater of claim 1, wherein the baffle shell is formed to have a hollow cross-sectional shape and disposed in a longitudinal direction of the housing unit, wherein one end of the baffle shell penetrates the baffle plate, wherein an inlet hole is formed at the other end of the baffle shell, wherein the first flow path is formed between the baffle shell and the housing unit, and wherein the second flow path is formed along the inside of the baffle shell.

3. The coolant heater of claim 2, wherein the baffle shell is disposed in the internal space of the housing unit so as to be placed coaxially with the housing unit, and wherein the first flow path is formed around the baffle shell.

4. The coolant heater of claim 2, wherein the inlet part is formed adjacent to one end of the baffle shell, and wherein the coolant introduced into the inlet part flows along the first flow path and then is introduced into the second flow path through the inlet hole formed at the other end of the baffle shell.

5. The coolant heater of claim 2, wherein the first heater part comprises:
a first sheath heater formed as a coil and disposed in the first flow path; and
a second sheath heater formed as a coil and disposed in the first flow path.

6. The coolant heater of claim 5, wherein the first sheath heater and the second sheath heater are coaxially disposed in a longitudinal direction of the first flow path.

7. The coolant heater of claim 5, comprising:
first support parts formed on an outer surface of the baffle shell and configured to support the first sheath heater and the second sheath heater.

8. The coolant heater of claim 5, wherein the second heater part comprises a third sheath heater formed as a coil and disposed in the second flow path.

9. The coolant heater of claim 8, comprising:
a second support part formed on an inner surface of the baffle shell and configured to support the third sheath heater.

10. The coolant heater of claim 8, comprising:
a controller configured to individually control the first sheath heater, the second sheath heater, and the third sheath heater.

11. The coolant heater of claim 10, wherein the controller individually controls the first sheath heater, the second sheath heater, and the third sheath heater by pulse width modulation (PWM) control.

12. The coolant heater of claim 10, comprising:
a coolant temperature sensor configured to measure an outlet temperature of the coolant discharged from the outlet part,
wherein when the outlet temperature of the coolant is higher than a predetermined temperature, the controller stops the operations of the first sheath heater, the second sheath heater, and the third sheath heater.

13. The coolant heater of claim 12, comprising:
a surface temperature sensor configured to measure a temperature of an outer surface of the housing unit,
wherein when the temperature of the outer surface of the housing unit is higher than a predetermined temperature, the controller stops the operations of the first sheath heater, the second sheath heater, and the third sheath heater.

14. The coolant heater of claim 13, wherein when the temperature of the outer surface of the housing unit is higher than the outlet temperature of the coolant, the controller stops the operations of the first sheath heater, the second sheath heater, and the third sheath heater.

15. The coolant heater of claim 13, comprising:
a thermal fuse connected to the housing unit,
wherein when the temperature of the outer surface of the housing unit is higher than an operating temperature of the thermal fuse, the thermal fuse cuts off a supply of power to the first sheath heater, the second sheath heater, and the third sheath heater.

16. The coolant heater of claim 10, comprising:
a water pump configured to supply the coolant to the inlet part,
wherein when an abnormal signal related to the water pump is detected, the controller stops the operations of the first sheath heater, the second sheath heater, and the third sheath heater.

17. The coolant heater of claim 8, wherein the housing unit comprises:
a first housing configured to receive therein the baffle assembly;
a first cover coupled to one end of the first housing;
a second housing disposed to surround the first housing;

a second cover coupled to one end of the second housing so as to cover the first cover;
a header plate coupled to the other end of the first housing and the other end of the second housing; and
a controller cover coupled to the header plate.

18. The coolant heater of claim 17, wherein a thermal insulation layer is formed between an outer surface of the first housing and an inner surface of the second housing.

19. The coolant heater of claim 17, comprising:
a sealing member interposed between the header plate and the other end of the first housing and the other end of the second housing.

* * * * *